United States Patent
Shahindoust

(10) Patent No.: US 7,385,721 B2
(45) Date of Patent: *Jun. 10, 2008

(54) WIRELESS WIDE AREA NETWORK PRINTING

(75) Inventor: Amir Shahindoust, Laguna Niguel, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 798 days.

This patent is subject to a terminal disclaimer.

(21) Appl. No.: 10/804,744

(22) Filed: Mar. 19, 2004

(65) Prior Publication Data

US 2004/0184100 A1 Sep. 23, 2004

Related U.S. Application Data

(63) Continuation-in-part of application No. 10/394,973, filed on Mar. 21, 2003.

(51) Int. Cl.
*G06F 15/00* (2006.01)
*H04B 7/00* (2006.01)

(52) U.S. Cl. ............... 358/1.15; 455/41.3; 455/557

(58) Field of Classification Search .......... 358/1.1, 358/1.6, 1.15, 403; 455/556.1, 556.2, 557, 455/41.3
See application file for complete search history.

(56) References Cited

U.S. PATENT DOCUMENTS

| | | | |
|---|---|---|---|
| 5,524,185 A | 6/1996 | Na | |
| 5,696,894 A | 12/1997 | Ono | |
| 5,784,622 A | 7/1998 | Kalwitz et al. | |
| 5,818,603 A | 10/1998 | Motoyama | |
| 5,828,840 A | 10/1998 | Cowan et al. | |
| 5,946,458 A | 8/1999 | Austin et al. | |
| 6,006,264 A | 12/1999 | Colby et al. | |
| 6,021,429 A | 2/2000 | Danknick | |
| 6,128,661 A * | 10/2000 | Flanagin et al. | 709/227 |
| 6,157,465 A | 12/2000 | Suda et al. | |
| 6,226,098 B1 | 5/2001 | Kulakowski et al. | |

(Continued)

FOREIGN PATENT DOCUMENTS

EP 0 872 792 10/1998

(Continued)

OTHER PUBLICATIONS

EP Search Report Dated Aug. 5, 2004 related to European Patent Application No. 04101158.6.

*Primary Examiner*—Kimberly A. Williams
(74) *Attorney, Agent, or Firm*—Tucker Ellis & West LLP

(57) ABSTRACT

A system that uses three different wireless technologies to print a document from a mobile device. The invention is comprised of a server and a client. The server is comprised of a controller, an 802.11x transceiver, a Bluetooth transceiver and a modem. The server waits for a connection from a mobile device and once a connection is detected determines the type of connection. The server uses the proper protocol to extract the print control data and interpret the print type. The server proceeds as normal, converts to printable format, and prints the document. The client can be a personal computer, a laptop, a personal data assistant, or a cellular telephone. The client operating systems include all versions of Windows, Palm OS, Handspring, and Simbian.

24 Claims, 6 Drawing Sheets

U.S. PATENT DOCUMENTS

| | | |
|---|---|---|
| 6,272,553 B2 | 8/2001 | Way et al. |
| 6,288,790 B1 | 9/2001 | Yellepeddy et al. |
| 6,332,166 B1 | 12/2001 | Cranford, Jr. et al. |
| 6,359,892 B1 | 3/2002 | Szlam |
| 6,378,070 B1 | 4/2002 | Chan et al. |
| 6,922,725 B2 * | 7/2005 | Lamming et al. ............ 709/227 |
| 6,924,826 B1 * | 8/2005 | Nakagiri et al. ............. 715/700 |
| 7,251,237 B2 * | 7/2007 | Inoue ......................... 370/338 |
| 2002/0016833 A1 | 2/2002 | Yajima et al. |
| 2002/0051169 A1 * | 5/2002 | Nishikawa ................. 358/1.15 |
| 2002/0181010 A1 * | 12/2002 | Pineau ...................... 358/1.15 |
| 2003/0050963 A1 * | 3/2003 | Lamming et al. ........... 709/203 |
| 2003/0078965 A1 * | 4/2003 | Cocotis et al. .............. 709/203 |
| 2003/0137954 A1 * | 7/2003 | Yokoyama ................. 370/331 |
| 2003/0142345 A1 * | 7/2003 | Bunn et al. ................ 358/1.15 |
| 2004/0025047 A1 * | 2/2004 | Mayne et al. ................ 713/200 |
| 2004/0162804 A1 * | 8/2004 | Strittmatter et al. ........... 707/1 |
| 2004/0198366 A1 * | 10/2004 | Crocker et al. ........... 455/452.1 |
| 2004/0203358 A1 * | 10/2004 | Anderson et al. .......... 455/41.1 |
| 2004/0239986 A1 * | 12/2004 | Wise ......................... 358/1.15 |
| 2005/0086282 A1 * | 4/2005 | Anderson et al. ........... 709/200 |
| 2005/0231761 A1 * | 10/2005 | Pineau ...................... 358/1.15 |
| 2006/0294251 A1 * | 12/2006 | Cocotis et al. .............. 709/229 |
| 2007/0022180 A1 * | 1/2007 | Cocotis et al. .............. 709/217 |
| 2007/0109591 A1 * | 5/2007 | Kamens et al. ............ 358/1.15 |
| 2007/0124436 A1 * | 5/2007 | Shepherd ................... 709/223 |

FOREIGN PATENT DOCUMENTS

| | | |
|---|---|---|
| EP | 1 271 298 | 1/2003 |
| WO | WO 03/019403 | 3/2003 |

* cited by examiner ns and is desirous of printing while away from his or her office. A method and/or system allowing a mobile client device to communicate with an image output system from anywhere in the world provides much needed flexibility for the mobile user.
WIRELESS WIDE AREA NETWORK PRINTING

CROSS-REFERENCE TO RELATED APPLICATIONS

The present application is a continuation-in-part of U.S. application Ser. No. 10/394,973 filed Mar. 21, 2003.

BACKGROUND OF THE INVENTION

The present invention pertains generally to wireless communication systems and, more particularly, to a method and system of communication between a mobile client device and a wireless wide area network image output system.

Users of mobile devices such as a laptop, personal data assistant, or cellular telephone can often access information over the Internet. However, to print this information, the users of these devices usually need to have an image output system physically connected to the client device, or the user must pre-store the document on an Internet-based storage that can only be accessed by special types of peripheral devices.

Mobile client devices are typically equipped with communications systems to communicate with a broad variety of other devices, ranging from a web server to an image output system. Such communications systems may incorporate connections involving IEEE 802.11x (Wi-Fi) or Bluetooth wireless networks. These technologies allow users using a mobile client device, such as notebook computers, personal digital assistants, or cellular telephones to connect wirelessly to the peripheral and initiate a print job or other output function. However, these mobile client devices do not provide a method or system for printing documents while at a remote location.

Furthermore, these mobile client devices are often limited to the type of communications channel they can establish with an image output system. While this may be suitable for a client device residing solely within a single installation, this is not suitable for a user who travels between installations and is desirous of printing while away from his or her office. A method and/or system allowing a mobile client device to communicate with an image output system from anywhere in the world provides much needed flexibility for the mobile user.

Thus a method, system and apparatus that bring total mobile printing capability to a mobile user by combining three different wireless technologies with a mobile client device and allow a user to print a document from any location is needed.

SUMMARY OF THE INVENTION

In accordance with the present invention, there is a method for generating an image from a mobile client device, comprising the steps of receiving a print request, the print request comprising a reference to a file to be printed, retrieving the file to be printed from a remote server, converting the document to be printed to a page description language document, and sending the page description document language document to the printer. In order to print a document from a remote location, the client device establishes a communication channel with the server. The controller, which is a part of the server, then determines the type of transmission occurring. Once the transmission type is determined, the controller is then able to receive a print request from the client device to print a file. The controller must then interpret whether the print request is a print by reference request or if it is a file print request. For the file to be sent on to the image output system, the format of the file must be supported. When the file is unsupported, the controller directs the termination of the connection between the client device and the server. The file, to be printed, must also be in a printable format. If the file is not in a printable format, the controller then converts the file so that printing may occur.

Further, in accordance with the present invention, there is a method for generating an image from a mobile client device, comprising the steps of receiving a print request, the print request comprising a file to be printed, sending the file to an application server, converting the file to a page description language document by the application server, and sending the page description language document to the printer. When a client device initiates a print command, the client device also selects an image output system to use. The print command may be issued through an application, e.g., word processing or spreadsheet, a specific user interface, or through a browser. Once selected, the type of the image output system chosen must be determined, that is to say, the type of image output system, be it Bluetooth enabled, IEEE 802.11x (Wi-Fi), cellular, dial up, or other communications means. The determination of type also indicates the appropriate communications channel to establish. The controller, considered a part of the server end of the communications, is connected to the image output system. The client device uses an image output system driver to send a file to be printed over the communications channel and to the controller. The file is then transmitted from the controller to the image output system.

Still further, in accordance with the present invention, there is provided an apparatus for generating an image from a mobile client device, comprising an image output system, a controller operatively coupled to the image output system, an image receiver, the image receiver comprising an 802.11 interface, a Bluetooth interface, a dialup interface, and wireless Internet service provider interface. The apparatus may also further comprise means adapted to determining when data is being received by the image receiver, and means adapted to routing the data input received by one of the group consisting of an 802.11 interface, a Bluetooth interface, a dialup interface, and a wireless Internet service provider interface, wherein the data received is sent to the controller. The apparatus allows for the wireless interface cards to receive data and then send that data to the controller. The controller is then able to process the data so that the image output system can print.

Still yet further in accordance with the present invention, there is provided a system for generating an image from a mobile client device, comprising means adapted for receiving a print request, the print request comprising a reference to a file to be printed, means adapted for retrieving the file to be printed from a remote server, means adapted for converting the file to be printed to a page description language document, and means adapted for sending the page description document language document to the printer. The system suitably further comprises means for routing the print request to the controller, the print request having been received by one of the group consisting of an 802.11 interface, a Bluetooth interface, a dialup interface, and a wireless Internet service provider interface. The system suitably further comprises means adapted for sending the file to one of the groups consisting of an application server and a file converter to convert the file. The system provides for receiving a print request from a mobile device through different wireless technologies and processing the print request.

Further in accordance with the present invention, there is provided a system for generating an image from a mobile client device, comprising means adapted for receiving a print request, the print request comprising a file to be printed, means adapted for sending the file to an application server, means adapted for converting the file to a page description language document by the application server, and means adapted for sending the page description language document to the printer. The system suitably further comprises means adapted for sending the page description language document to a spooler, and means adapted for raster image processing the page description language document. The system may also comprise means adapted to receiving the print request from an 802.11 interface card, a Bluetooth interface card, a dialup interface, and a wireless Internet service provider interface.

Still other aspects of the present invention will become readily apparent to those skilled in the art from the following description wherein there is shown and described a preferred embodiment of this invention, simply by way of illustration of one of the best modes best suited for to carry out the invention. As it will be realized, the present invention is capable of other different embodiments and its several details are capable of modifications in various obvious aspects all without from the invention. Accordingly, the drawing and descriptions will be regarded as illustrative in nature and not as restrictive.

While the present invention would typically be implemented in both hardware and software, as those skilled in the art can readily appreciate, the present invention may be implemented in either hardware or software, or a combination thereof.

BRIEF DESCRIPTION OF THE FIGURES

The accompanying drawings incorporated in and forming a part of the specification, illustrate several aspects of the present invention, and together with the description server to explain the principals of the invention. In the drawings.

These and additional embodiments of the invention may now be better understood by turning to the following detailed description wherein an illustrated embodiment is described.

DETAILED DESCRIPTION OF THE PREFERRED EMBODIMENTS

The present invention is directed to a system and method for printing from a mobile client device to a wireless wide area network printer utilizing three different interfaces. Although the present invention is described as enabling a mobile client device to communicate with a wireless wide area network printer using a Bluetooth wireless personal area network, an IEEE 802.11x wireless local area network, a dialup based wireless wide area network, and a cellular based wireless wide area network, it will be appreciated by those skilled in the art that the present invention is also suitably designed to incorporate any other wireless communication channels, such as HomeRF, infrared, or other electronic communication means. Throughout this description, the preferred embodiment and examples shown should be considered as exemplars, rather than limitations, of the present invention.

When printing to an image output system, such as a printer, printer/copier, or multi-function peripheral there are two types of print requests, a file print request and a print by reference print request. A file print request is suitably of two kinds, a regular print where the printer driver on the client side has generated a page description language (PDL) file and a raw file in the format of the application that created the file and now is sent using object exchange (OBEX). A print by reference request entails the user sending either a file to be printed or the uniform resource locator (URL) of the server where the document resides.

Figure 1:
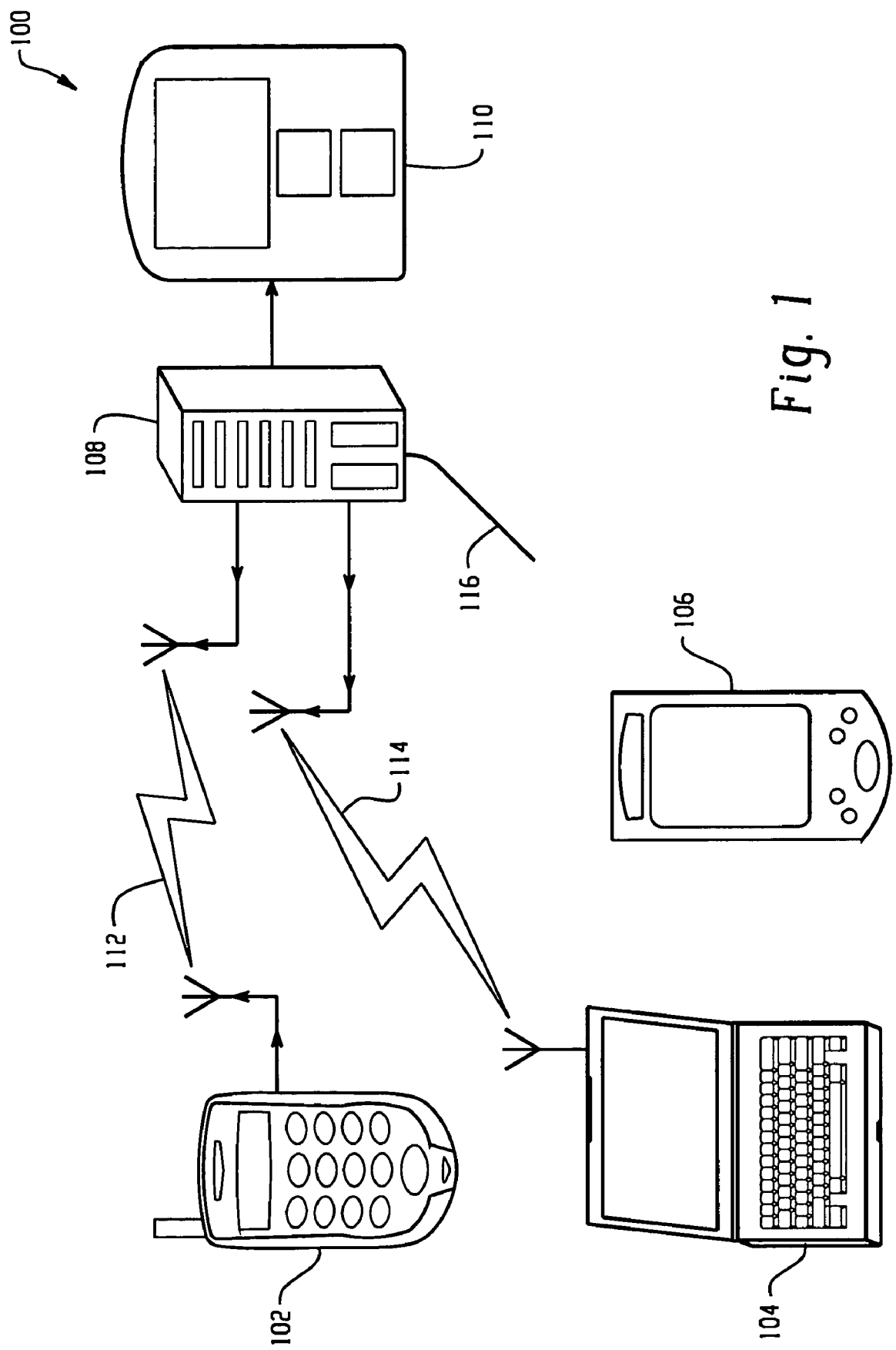
FIG. 1 is an example of a wireless wide area network.

Referring first to FIG. 1, there is shown an example of a wireless wide area network 100 contemplated by the present invention. A server referred to as a controller 110 is operatively coupled to an image output system 112. The controller 110 is connected to mobile clients over a dialup connection 114, an IEEE 802.11x connection 116, a Bluetooth connection 118, or a cellular network connection 120. The mobile clients comprise a telephone 102, a notebook computer 104, a personal data assistant 106, and a cellular telephone 108. The connection between the telephone 102, the notebook computer 104, the personal data assistant 106, or the cellular telephone 120 and the controller 108 is suitably also over a wired local area network or even directly connected to the image output system 112 via a parallel port, Universal Serial Bus, or other physical connection. In the preferred embodiment, the connection between the controller 110 and the mobile client device 102, 104 or 106, and 108 is a wireless wide area connection.

Figure 2:
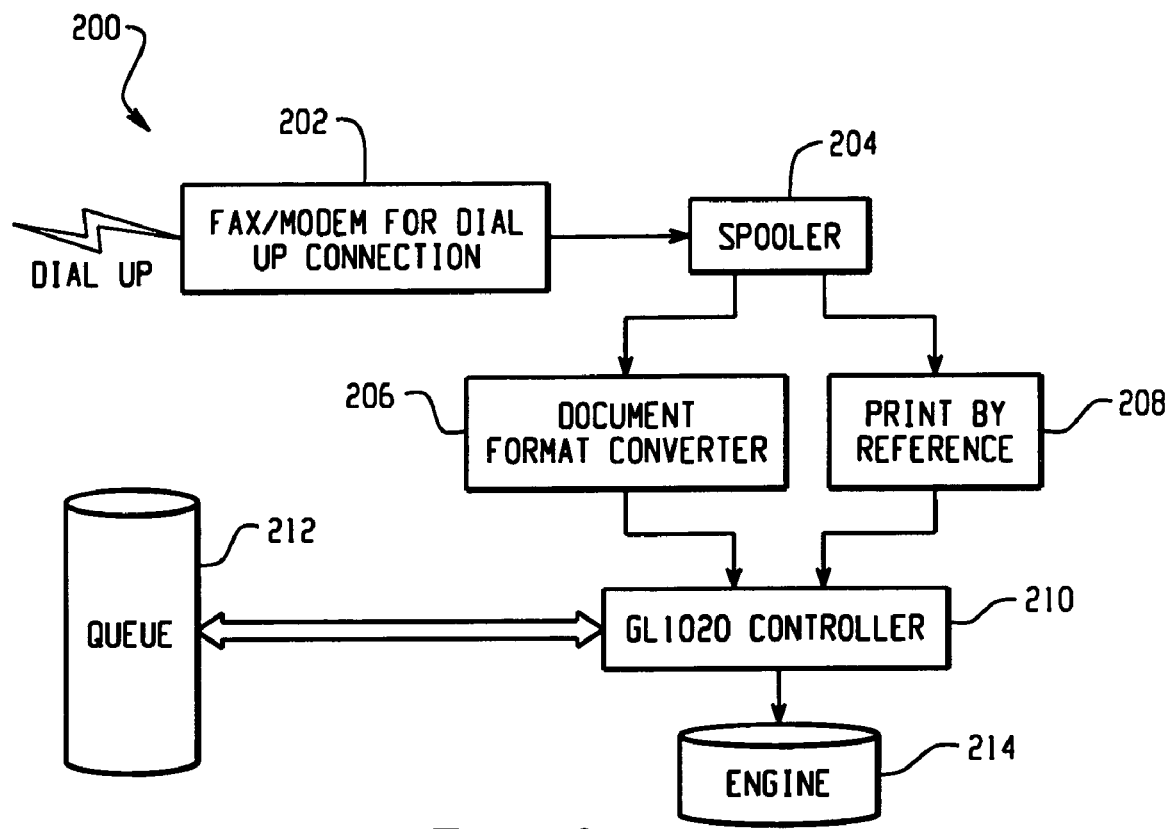
FIG. 2 is an example of a block diagram of a wireless wide area network print server architecture.

Referring now to FIG. 2, there is shown an example of a block diagram of a print server architecture 200 employing a dialup connection or a HTTP connection with a mobile client device. In one embodiment, the fax/modem 202 establishes a connection with a mobile client device, wherein a controller 212 verifies the mobile client device is authorized to access the print server architecture 200 and use the image output system. The fax/modem 202 is communicatively coupled to a spooler 206, which is responsible for receiving the print request or file from the mobile client device. In another embodiment, an HTTP connection 204 is established with a mobile client device, wherein the controller 212 verifies that the mobile client device is authorized to access the print server architecture 200 and use the image output system. In this embodiment, the spooler 206 receives the print request or file from the mobile client device via the HTTP connection.

The spooler 206 is coupled to a document format converter 208 and a print by reference processor 210. The document format converter 208 and the print by reference processor 210 are connected to the controller 212, which receives a file from either the document format converter 208, the print by reference processor 210, or both. The file is then stored in a queue 214, until such time as the converter 212 sends the file to the engine 216, wherein the engine 216 is an image output system.

Figure 3:
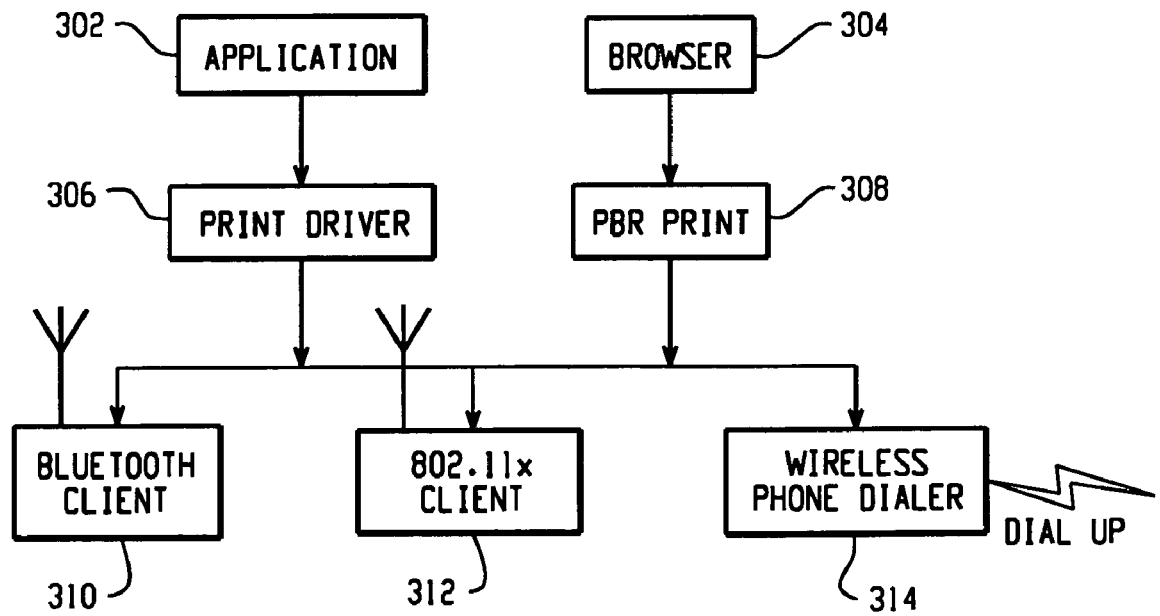
FIG. 3 is a block diagram of a wireless wide area network client architecture.

Referring now to FIG. 3, there is illustrated a block diagram example of a wireless wide area network print client architecture 300. As shown, three primary methods for initiating a print command are shown, an application 302, a browser 304, or an Internet connection through suitable GPRS/WDMA interface 306. The application 302 allows a user to initiate a print command by sending the print file via means of the print driver 308 to the communications means being utilized by the client device of the user. Such communications means, as shown, include, but are not limited to, a Bluetooth transceiver 314, an IEEE 802.11x transceiver 316 or a wireless fax/modem 318.

Similarly, if the user initiates a print command from the browser 304, the mobile client device determines the print by reference 310 location of the requested document and proceeds to send the file for printing via means of the Bluetooth transceiver 314, the IEEE 802.11x transceiver 316 or the fax/modem 318.

If a user initiates a print command through an Internet connection via a mobile client device such as a cellular telephone 306, the cellular telephone uses wireless markup language to establish an HTTP connection 312. The cellular telephone is connected to a wireless telephone Internet Service Provider 320 to connect to the print client architecture.

Figure 4:
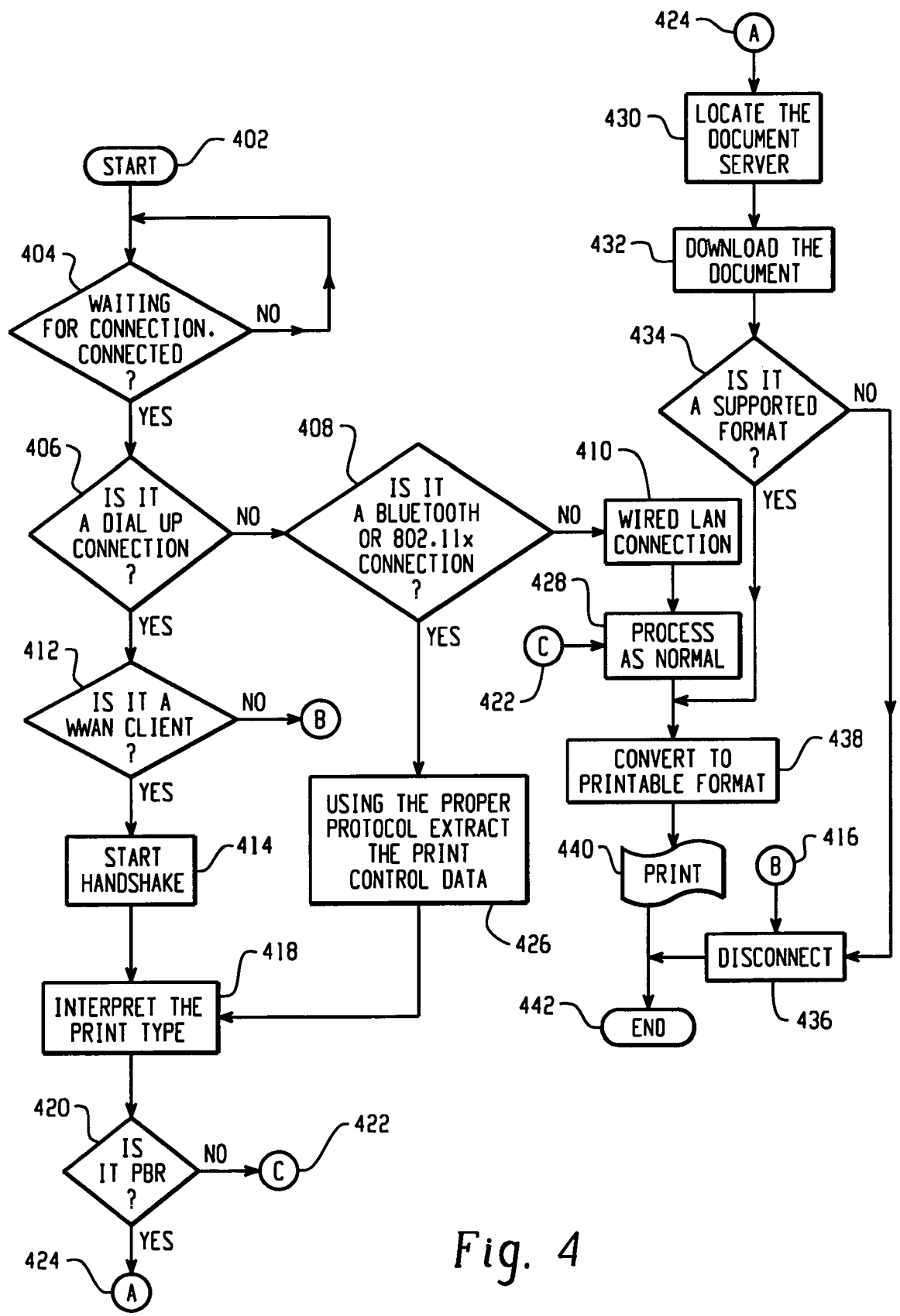
FIG. 4 is a flow chart of a printer server operation.

In FIG. 4, there is illustrative a flow chart for printing from a mobile client device as enacted by the server portion of the present invention. The system starts at step 402. At step 404, the system is waiting for a connection and determining if the connection is made. When the connection is made, the system then determines if the connection established in step 404 is a dialup or a WML connection per step 406. When step 406 determines that the connection established in step 404 is neither a dialup nor a WML connection, the system proceeds to step 408 wherein the system determines if the connection established in step 404 is a Bluetooth personal area network or 802.11x local area network wireless connection. Step 410 occurs when step 408 determines that the connection is not a Bluetooth or 802.11x wireless connection. At step 410, the system determines that the connection established between a mobile client device and the server is a wired local area network connection. Upon the establishment of a wired local area network connection, the system proceeds in step 428 to process the print request as normal. This would typically involve receiving the file to be printed and the converting the file to a printable format in step 438. Once the file is converted to the printable format of step 438, the file is then printed in step 440. Step 440 involves transmitting the converted file to the image output system, where in the present embodiment, the file is printed. The process is completed in step 442.

An alternative option occurs in step 406 when the connection is determined to be a dialup connection. The system proceeds to establish that the mobile client device is a wireless wide area network client in step 412. A determination that the mobile client device is not a wireless wide area network client in step 412 prompts the system to step 416, wherein the connection is disconnected in step 436. Provided the mobile client device is a wireless wide area network client in step 412, the mobile client device and the server begin authenticating 414, wherein the system determines the mobile client device is authorized to request a print job. The system then interprets the print type in step 418. Step 420 allows the system to progress to deciding if the print type is a print by reference request. If the print type is not a print by reference request, the system then proceeds to steps 428, 438 through 442.

As discussed above, if the print type denotes a print by reference request, the system then proceeds via 424 to step 430, wherein a document server containing the requested print job is located. Upon locating the document server in step 430, the system then downloads the requested print job in step 432. The requested print job downloaded from the document server is then processed in step 434 to establish the print job is in a supported format. If the print job is not in a supported format, the system proceeds to step 436 whereby the connection is terminated. Upon the system determining the print job is in a supported format in step 434, the system proceeds to steps 438-442, and the document is printed.

An alternative option is presented when the system determines in step 408 that the connection established between the mobile client device and the server is a Bluetooth or 802.11x connection. The system then proceeds to step 426 wherein the proper protocol is used to extract the print control data of the print request from the user. Once the print control data is extracted from the print request, the system then interprets the print type in step 418. The print type may be a print by request or a normal file print. Step 420 provides for the system to determine if the print request is a print by reference or normal print request. If the print request is a normal print request, the system proceeds via 422 to step 428. The file is then converted to a printable format in step 438 and sent to the image output system for printing in steps 440 and 442.

A print by reference request in step 420 proceeds via 424 to step 430, wherein a document server is located. Once the system has located the document server in step 430, the requested file is downloaded in step 432. The downloaded file of step 432 is then determined to be in a supported format in step 434. When the downloaded file is not in the supported format of step 434, the system proceeds to step 436 whereby the connection with the client device is terminated. A supported format of step 434 is then converted to a printable format in step 438. The system then progresses to transmit the printable format file to the image output system in step 440 and conclude the operation.

Figure 5:
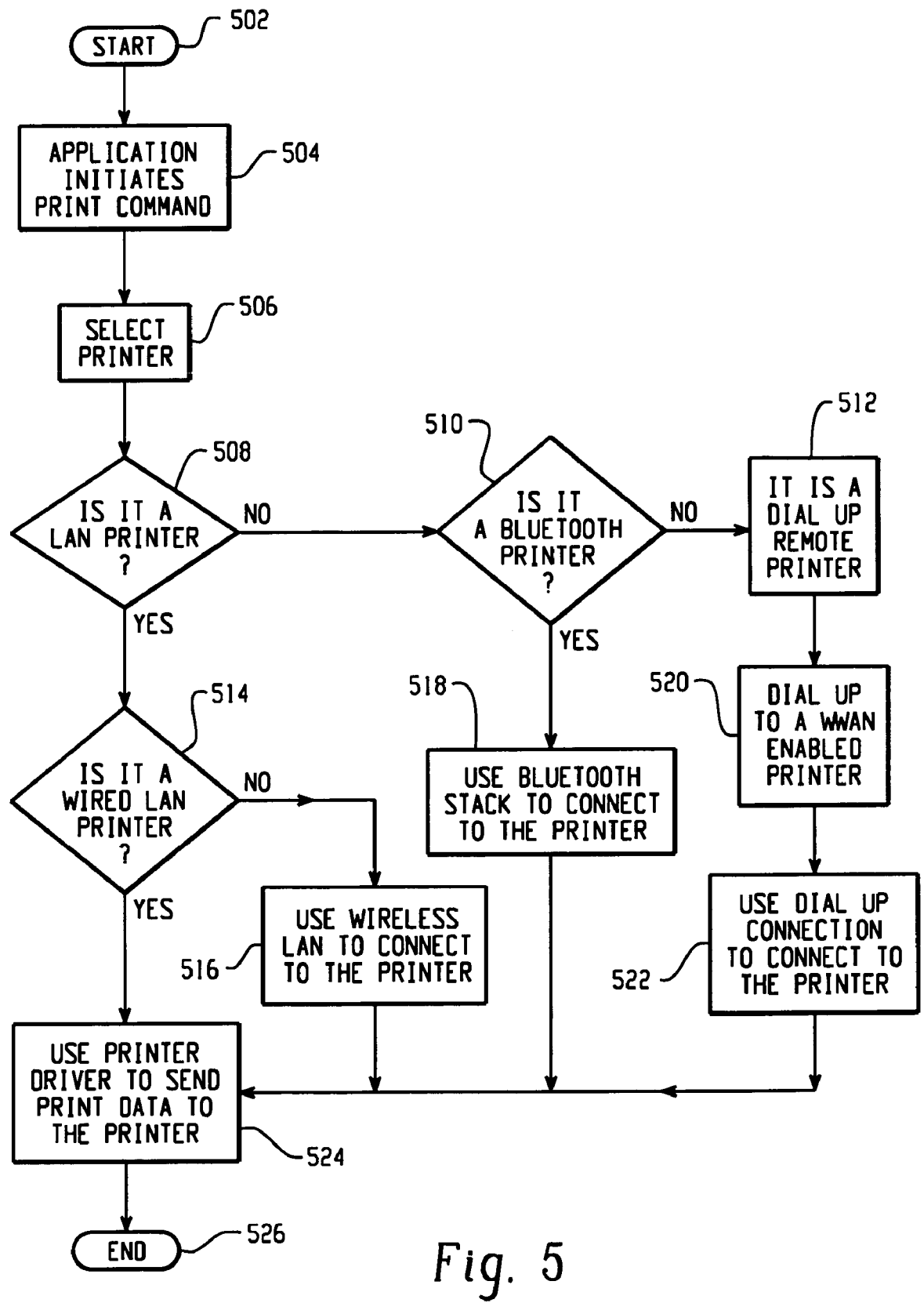
FIG. 5 is a flow chart of a method for using a wireless client with the present invention.

In FIG. 5, there is illustrated a flow chart representing a method for printing from a client device as enacted by the client side of the present invention. The system starts at step 502. At step 504, a user initiates a print command on the mobile client device. The print command may be initiated through an application, a specific user interface or a typical browser. The user is then prompted to select an image output system in step 506. Upon the selection by the user in step 506, the mobile client device then determines in step 508 if the image output system is a local area network image output system.

If at step 508 it is determined that the selected printer is a Local Area Network (LAN) printer, processing proceeds to step 514 where it is determined whether the selected printer is a wired printer. If at step 514 it is determined that the printer is not a wired printer, then processing proceeds to step 516 whereupon the Wireless LAN is used to connect to the printer. If at step 514 it is determined that the printer is a wired LAN printer, then at step 526 the printer driver is used to send print data to the printer. The process ends at step 528.

If at step 508 it is determined that the selected printer is not a LAN printer, then at step 510 it is determined if the selected printer is a Bluetooth printer. If the selected printer is a Bluetooth printer, then processing continues to step 518 wherein the Bluetooth stack is used to connect to the printer and then at step 526 the printer driver is used to send print data to the printer.

If at step 510 it is determined that the selected printer is not a Bluetooth printer, processing then proceeds to 512 wherein it is determined if the printer is a dialup remote printer. If the printer is a dialup remote printer, the process proceeds to step 520 wherein it is assumed that the printer is a dial up remote printer. Processing then progresses to step 522 wherein the client dials up to a WWAN enabled printer and then at step 524 the dial up connection is used to connect to the printer. At step 526, the printer driver is used to send print data to the printer.

If at step 512 it is determined that the selected printer is not a dialup remote printer, then the processing proceeds to step 530 wherein it is determined that the printer is a cellular telephone printer. Processing then proceeds to step 532 wherein the printer is connected to a wireless Internet service provider. Wireless markup language is used to connect the printer as shown at step 534. At step 526, the printer driver is used to send the print data to the printer.

It should be noted that the print data submitted to the server in steps 524-526 is suitably either a normal print operation, wherein the file originates from the mobile client device or a print by reference request, wherein the file is stored on a document server.

Figure 6:
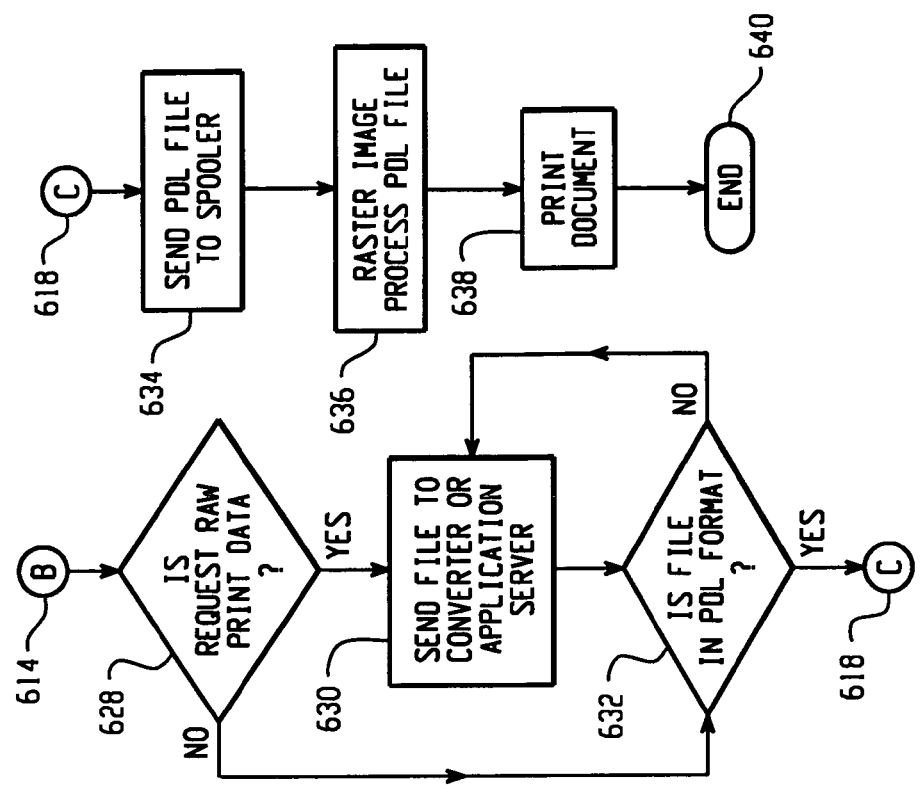
FIG. 6 is a flow chart of an implementation of the dialup wireless wide area network print server.
Figure 6:
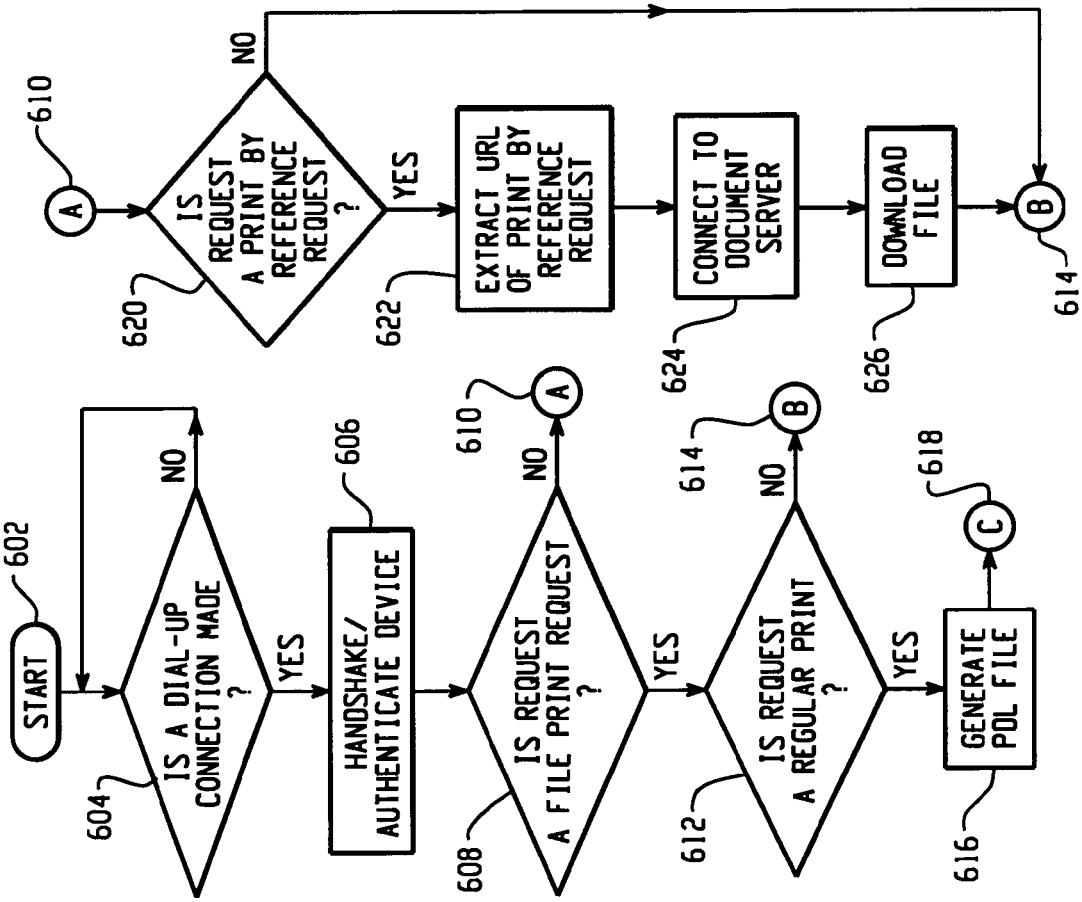

In FIG. 6, there is illustrated a method for the server to process a request from a mobile client device. The system starts at step 602. At step 604, the server determines that a connection is established with the mobile client device. Authentication of the mobile client device occurs in step 606, whereby the server determines that the mobile client device is authorized to use the wireless wide area network image output system. The system progresses to step 608 when the server determines that the dialup request is a file print request. Provided step 612 determines that the print request is a regular print request, the process moves on to generate a Page Description Language (PDL) file in accordance with step 616. The PDL file is then sent via 618 to step 634 wherein the PDL file is sent to the spooler of the controller. Once the PDL file arrives at the spooler in step 634, the file is then raster image processed in step 636. The raster image processed document is then ready for printing in steps 638 and 640.

An alternative option is presented in step 608 when the dialup print request is determined to be a print by reference request, as shown in step 620. Step 610 denotes the transition to step 620 wherein the print by reference request is determined. Upon completion of step 620, step 622 instructs the server to extract the URL of the document requested. The server then connects to the document server in step 624 where the document requested is stored. The server downloads the requested file in step 626 and proceeds via 614 to step 628.

After downloading the file in accordance with the print by reference request, the server then executes step 628, which determines whether the requested file is raw print data. When the filed downloaded in step 626 is already in PDL format, the system progresses from step 628 to 632 for affirming the format of the downloaded file. A PDL format in step 632 results in sending the PDL file downloaded from the document server in step 626 to the spooler in step 634 via transition 618. The PDL file is then raster image processed in step 636 and printed in steps 638 and 640.

Returning to step 628, if the server determines that the print by reference file downloaded in step 626 is raw print data, the file proceeds to step 630, wherein the raw print data is sent to either a file converter or application server for conversion into the PDL format of step 632. The PDL file is then sent via 618 to step 634 wherein the PDL file is sent to the spooler of the controller. Once the PDL file arrives at the spooler in step 634, the file is then raster image processed in step 636. The raster image processed document is then ready for printing in steps 638 and 640.

A further alternative option is presented when the dialup print request is determined not to be a regular file print in step 612. The print request is then forwarded from step 612, via transition 614, to step 628 where the system analyzes the print request and identifies the print request as constituting raw print data. Since the raw print data constituting the print request must undergo conversion to PDL before progressing the print request, the raw print data is sent to a file converter or application server for conversion to PDL format in step 630. Once converted, the PDL file is then sent via 618 to step 634 wherein the PDL file is sent to the spooler of the controller. Once the PDL file arrives at the spooler in step 634, the file is then raster image processed in step 636. The raster image processed document is then ready for printing in steps 638 and 640.

Figure 7:
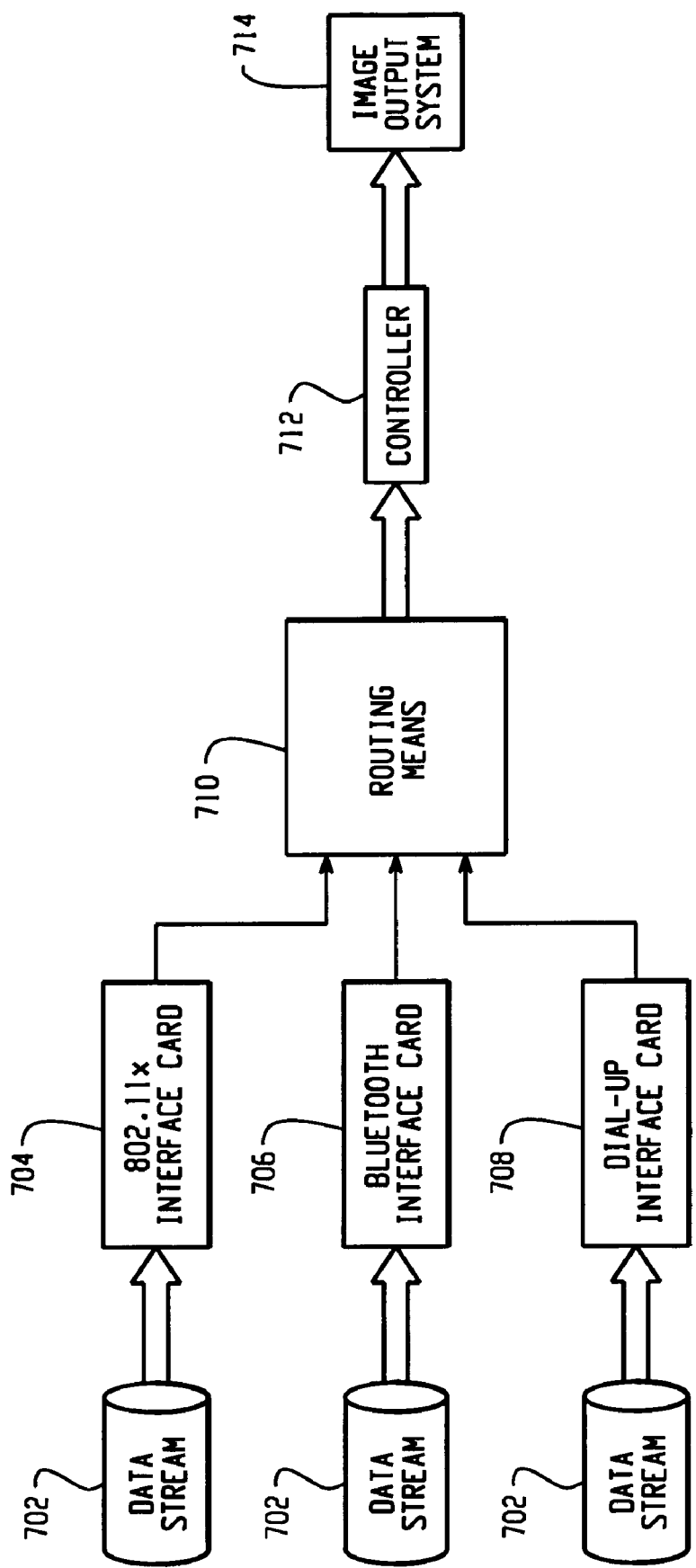
FIG. 7 is a block diagram representation of data flow received by an image receiver to an image output system.

Referring now to FIG. 7, there is illustrated a block diagram of the image output system. Typically, the image output system 716 would comprise a printer, but need not be so limited. Other types of image output systems, including, but not limited to, a copier, a copier/printer, a multifunction printer, are also contemplated by the present invention. A data stream 702, as contemplated herein, may comprise any number of different types of data, such as a document, a file, an image, a graph, a chart, or a URL denoting the location of the file or document. As shown in FIG. 7, the data stream 702 may be received by any of the 802.11x interface card 704, the Bluetooth interface card 706, the dialup interface card 708, or a wireless Internet service provider interface card 710, depending upon the type of data stream being sent. For example, if the data stream 702 were transmitted over a Bluetooth communications channel, the Bluetooth interface card 706 would receive the incoming data stream 702, while the 802.11x interface card 704, the dialup interface card 708, and the wireless Internet service provider card would not receive any of the incoming data stream. The interface cards 704, 706, 708, and 710 are incorporated into the image receiver allowing for the integration of the four different wireless technologies.

Routing means 712 is operatively coupled to the 802.11x interface card 704, the Bluetooth interface card 706, the dialup interface card 708, and the wireless Internet service provider interface card. Routing means for sending a signal through a system are well known in the art.

In one embodiment, the routing means 712 receives input from all four interface cards 704, 706, 708, and 710 and determines when a data stream 702 comprising a file is being received. Upon receipt of the data stream 702 by the routing means 712, the apparatus provides for sending the data stream 702 to the controller 714. The controller 714 is equipped to interpret the data stream 702 received by the interface cards 704, 706, 708, and 710. For example, a Toshiba Controller GL1010 or GL1020 suitably accomplishes this action, but any controller known in the art for network printing would suffice. The controller 714 processes the data stream 702, extracting a URL of a file to download, a file to send to an application server or converter, or a document. The controller 714 is operatively coupled to the image output system 716. The controller 714 will forward the print data, either extracted directly from the data stream 702 or received from a document server, to the image output system 716 for printing.

In another embodiment, the routing means 712 is capable of receiving data from a plurality of the 802.11x interface card, the Bluetooth interface card, the dialup interface card, or the wireless Internet service provider interface. In this embodiment, a multi-threaded processor with multiple queues may store data from any combination of the interface cards simultaneously and upon completion of receipt of the data stream, forward the data stream to the controller 714 for processing.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skilled in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A system for printing documents from a portable data device comprising:
    print request receiver means adapted for receiving a print request from an associated portable data device, wherein the print request includes a selected one of a request for a printout of electronic document data stored on the portable data device, identification data corresponding to an origin of a received print request, and reference data representative of an electronic document stored in a location other than the portable data device;
    means adapted for testing for a first data connection type between the portable data device and a document processing device;
    means adapted for testing for an alternative connection type between the portable data device and the document processing device when the testing indicates that the first data connection type is unavailable;
    means adapted for selecting a data connection type in accordance with at least one of the means adapted for testing;
    protocol selection means adapted for selecting a file transmission protocol between the portable data device and the document processing device in accordance with a determined data connection type;
    document data receiver means adapted for receiving document data representative of a document for which a printout is desired via a protocol established by the protocol selection means;
    formatting means adapted for formatting document data in accordance with a selected associated printing device;
    communicating means adapted to communicate formatted document data to the selected associated printing device so as to facilitate printing a document therefrom, and
    wherein the first data connection type has improved transmission characteristics over the alternative connection type.

2. The system for printing documents from a portable data device of claim 1 wherein the associated portable data device comprises one of a group consisting of a telephone, a notebook computer, a personal data assistant and a web-enabled cellular telephone.

3. The system for printing documents from a portable data device of claim 1 wherein the document data receiver means includes a spooler adapted for spooling the document data prior to formatting thereof.

4. The system for printing documents from a portable data device of claim 1 wherein the print request receiver means includes means adapted for authenticating the associated portable data device.

5. The system for printing documents from a portable data device of claim 1 wherein the print request originates from one of a group consisting of an application, a browser and an Internet connection.

6. The system for printing documents from a portable data device of claim 5 wherein the application and the browser operate on one of a group consisting of a notebook computer, a personal data assistant and a web-enabled cellular phone.

7. A method for printing documents from a portable data device comprising the steps of:
    receiving a print request from an associated portable data device, wherein the print request includes a selected one of a request for a printout of electronic document data stored on the portable data device, identification data corresponding to an origin of a received print request, and reference data representative of an electronic document stored in a location other than the portable data device;
    testing for a first data connection type between the portable data device and a document processing device;
    testing for an alternative connection type between the portable data device and the document processing device when the step of testing indicates that the first data connection type is unavailable;
    selecting a data connection type in accordance with at least one of the testing steps;
    selecting a file transmission protocol between the portable data device and the document processing device in accordance with a determined data connection type;
    receiving document data representative of a document for which a printout is desired via a protocol established by the step of selecting a protocol;
    formatting document data in accordance with a selected associated printing device; and
    communicating the formatted document data to the selected associated printing device so as to facilitate printing a document therefrom; and
    wherein the first connection type has improved transmission characteristics over the alternative connection type.

8. The method for printing documents from a portable data device of claim 7 wherein the print request originates from one of a group consisting of an application, a browser and an Internet connection.

9. The method for printing documents from a portable data device of claim 8 wherein the application and the browser operate on one of a group consisting of a notebook computer, a personal data assistant and a web-enabled cellular phone.

10. The method for printing documents from a portable data device of claim 7 further comprising the step of spooling the document data prior to formatting thereof.

11. The method for printing documents from a portable data device of claim 7 further comprising the step of authenticating the associated portable data device.

12. The method for printing documents from a portable data device of claim 7 wherein the associated portable data device comprises one of a group consisting of a telephone, a notebook computer, a personal data assistant and a web-enabled cellular telephone.

13. A computer readable medium having encoded thereon instructions for printing documents from a portable data device comprising:

print request receiver means adapted for receiving a print request from an associated portable data device, wherein the print request includes a selected one of a request for a printout of electronic document data stored on the portable data device, identification data corresponding to an origin of a received print request, and reference data representative of an electronic document stored in a location other than the portable data device;

means adapted for testing for a first data connection type between the portable data device and a document processing device;

means adapted for testing for an alternative connection type between the portable data device and the document processing device when the testing indicates that the first data connection type is unavailable;

means adapted for selecting a data connection type in accordance with at least one of the means adapted for testing;

protocol selection means adapted for selecting a file transmission protocol between the portable data device and the document processing device in accordance with a determined data connection type; document data receiver means adapted for receiving document data representative of a document for which a printout is desired via a protocol established by the protocol selection means;

formatting means adapted for formatting document data in accordance with a selected associated printing device;

communicating means adapted to communicate formatted document data to the selected associated printing device so as to facilitate printing a document therefrom; and wherein the first data connection type has improved transmission characteristics over the alternative connection type.

14. The computer readable medium having encoded thereon instructions for printing documents from a portable data device of claim 13 wherein the associated portable data device comprises one of a group consisting of a telephone, a notebook computer, a personal data assistant and a web-enabled cellular telephone.

15. The computer readable medium having encoded thereon instructions for printing documents from a portable data device of claim 13 wherein the print request originates from one of a group consisting of an application, a browser and an Internet connection.

16. The computer readable medium having encoded thereon instructions for printing documents from a portable data device of claim 15 wherein the application and the browser operate on one of a group consisting of a notebook computer, a personal data assistant and a web-enabled cellular phone.

17. The computer readable medium having encoded thereon instructions for printing documents from a portable data device of claim 13 wherein the document data receiver means includes a spooler adapted for spooling the document data prior to formatting thereof.

18. The computer readable medium having encoded thereon instructions for printing documents from a portable data device of claim 13 wherein the print request receiver means includes means adapted for authenticating the associated portable data device.

19. A computer-implemented method for printing documents from a portable data device comprising the steps of:

receiving a print request from an associated portable data device, wherein the print request includes a selected one of a request for a printout of electronic document data stored on the portable data device, identification data corresponding to an origin of a received print request, and reference data representative of an electronic document stored in a location other than the portable data device;

testing for a first data connection type between the portable data device and a document processing device;

testing for an alternative connection type between the portable data device and the document processing device when the step of testing indicates that the first data connection type is unavailable;

selecting a data connection type in accordance with at least one of the testing steps;

selecting a file transmission protocol between the portable data device and the document processing device in accordance with a determined data connection type;

receiving document data representative of a document for which a printout is desired via a protocol established in the step of selecting a protocol;

formatting document data in accordance with a selected associated printing device;

communicating the formatted document data to the selected associated printing device so as to facilitate printing a document therefrom; and wherein the first data connection type has improved characteristics over the alternative connection type.

20. The computer-implemented method for printing documents from a portable data device of claim 19 further comprising the step of authenticating the associated portable data device.

21. The computer-implemented method for printing documents from a portable data device of claim 19 wherein the associated portable data device comprises one of a group consisting of a telephone, a notebook computer, a personal data assistant and a web-enabled cellular telephone.

22. The computer-implemented method for printing documents from a portable data device of claim 19 wherein the print request originates from one of a group consisting of an application, a browser and an Internet connection.

23. The computer-implemented method for printing documents from a portable data device of claim 22 wherein the application and the browser operate on one of a group consisting of a notebook computer, a personal data assistant and a web-enabled cellular phone.

24. The computer-implemented method for printing documents from a portable data device of claim 19 further comprising the step of spooling the document data prior to formatting thereof.

\* \* \* \* \*